United States Patent Office 2,964,397
Patented Dec. 13, 1960

2,964,397
COPPER-BORON ALLOYS

Hugh S. Cooper, Shaker Heights, Ohio (Box 3991, Cleveland 20, Ohio), assignor to Walter M. Weil, Shaker Heights, Ohio No Drawing. Filed July 28, 1958, Ser. No. 751,129

8 Claims. (Cl. 75—153)

This invention relates to a new and improved method for producing alloy compositions of copper and boron.

For many years, it was thought that copper and boron could not be alloyed together. More recently, however, it was found that alloys of this type containing small amounts of boron could be made by reaction between various materials containing copper and boron either chemically or physically combined therein. The use of these materials rather than elemental boron and copper did not prove commercially successful for a number of reasons. Only small amounts of boron could be introduced into the alloys. The alloys contained sizeable quantities of undesirable elements introduced as part of the starting materials. In addition, the yields were poor even when complicated processes were used to produce the alloys.

The principal objects of the present invention are to produce high purity boron-copper alloys by a simple and economically feasible process utilizing elemental boron and elemental copper as the starting materials; to produce high purity boron-copper alloys containing up to about 10% by weight of boron which may be used as master alloys; and to produce boron-copper alloys containing up to about 5% boron by weight having a high degree of ductility.

The foregoing and other objects of the invention will be more fully appreciated from the following detailed description and from the specific examples of the invention given for illustrative purposes.

Boron-copper alloy compositions may be prepared in accordance with the present invention by intimately mixing particulate, e.g., granular or powdered, boron with particulate, e.g., granular or powdered, copper and rapidly heating the resulting mixture to a temperature above 1450° C. The starting materials are thoroughly mixed together to obtain as high a degree of mutual contact as possible between the particles of boron and copper. For this purpose, finely divided starting materials are generally preferred.

Advantageously, the intimate mixture of these starting materials is compressed into a coherent mass. For example, the mixture may be briquetted and then placed in a crucible for the heating step. Also, the mixture may be placed in a crucible and tamped down to produce the desired coherent mass.

The intimate mixture of boron and copper is rapidly heated in a furnace to a temperature above about 1450° C. and generally between about 1450° and 1700° C. The heating is advantageously conducted in an inert atmosphere containing an inert gas such as argon, helium, hydrogen, etc.

It is preferred that the heating of the mixture be conducted as rapidly as possible to bring the mixture quickly up to alloying temperature. It has been found especially advantageous to form the copper-boron compositions of the present invention by introducing the mixture of the two starting materials into an inert atmosphere which has been previously heated to the desired temperature (above 1450° C.). This procedure minimizes the period of time during which the mixture is undergoing heating prior to reaching alloying temperatures.

Effective solution or alloying of the boron in the copper does not seem to occur until a temperature of about 1450° C. is reached. Much below this temperature, e.g., at about 1300° C., the solubility of boron in the molten copper is very low, it dissolves very slowly, and the fusion mixture is very mushy and cannot be poured. The melt does not begin to thin out appreciably until the temperature approaches 1450° C., at which temperature the boron seems to dissolve much more readily. Most effective utilization of the boron is achieved at about 1500° C. or higher, at which temperature the melt is nicely liquid, and it is advantageous to continue to raise the temperature to about 1650–1700° C. to further increase the fluidity of the molten alloy and facilitate the casting thereof. During heating of the mixture, a considerable amount of the boron which has been wetted by molten copper but not yet dissolved therein will float on the surface of the melt, and its solution is facilitated by stirring the melt until all the boron on the surface vanishes into solution.

In accordance with the method of the present invention, boron-copper alloy compositions may be prepared containing up to about 10% by weight of boron. When more than about 10% by weight of boron is present in the alloy, a different composition appears to be formed during the heating step. This composition is too thick and viscous to be poured into castings even at 1700° C.

Alloys containing up to about 5% boron possess high ductility and may be formed directly into desired shapes by forging, drawing, rolling or other forming operations. Alloys containing between about 5 and 10% boron, although not readily shaped, are useful as master alloys in the preparation of alloys of the type described above containing smaller amounts of boron.

Particularly useful are boron-copper alloys made by the method of the invention and containing from about 0.1% to about 0.8% boron. These alloys possess much higher tensile strength and far greater resistance to failure from bending than plain copper, while being readily cold or hot worked and drawn or rolled to desired shapes and dimensions.

The present invention is preferably carried out using elemental boron of relatively high purity (e.g., about 99%), although, if desired, various presently available grades of so-called "elemental boron" containing substantial amounts of boron oxides and small amounts of metallic impurities may be employed. However, these impurities may adversely affect the yields and properties of the final product, for example, by reducing the malleability of the alloys as compared with alloys made with boron of high purity.

Various aspects of the invention will be more fully understood from the following examples and the accompanying discussions. In the examples, all of the percentages given are by weight.

EXAMPLE I 25 grams of boron particles of about 40 mesh size and containing 99+% boron were mixed in a ball mill with 475 grams of copper powder of about 40 mesh size. 500 grams of this mixture were compressed into briquettes and the briquettes added to a graphite crucible in a furnace containing a hydrogen atmosphere which had previously been heated to a temperature of about 1450° C. The heating was continued for about ½ hour at 1500°–1600° C. with gentle mixing using a graphite rod.

The resulting molten alloy was cast into slabs one-third inch thick, four inches wide, and six inches long. The castings had a gold bronze appearance and contained 4.20% boron. The castings could be hand sheared and cold hammered with ease into various shapes. However, the castings could be cut with a saw only with considerable difficulty. Portions of these castings were used as master alloys in the following example.

EXAMPLE II

A series of copper-boron alloys containing 0.10 to 0.90% boron were prepared by adding portions of the product prepared in Example I to molten copper. The alloys were cast into rods 0.375 inch in diameter and 6.5 inches long, after which they were hot rolled to 0.150 inch in diameter, then cold swaged to 0.128 inch in diameter and finally annealed for 30 minutes in hydrogen at 850° C. Samples were tested for tensile strength and elongation in both the cold swaged and the annealed condition. In addition, the annealed samples were subjected to bending tests in which the samples were subjected to repeated 180° bends over an 8 mm. radius until fractured. Table I shows the results of the tests.

*Table I*

| Run No. | 1 | 2 | 3 | 4 | 5 |
|---|---|---|---|---|---|
| Calculated percent B | 0.12 | 0.24 | 0.48 | 0.96 | 0.96 |
| Actual percent B | 0.10 | 0.21 | 0.41 | 0.80 | 0.90 |
| Cold worked: | | | | | |
| Tensile strength p.s.i. | 38,710 | 40,550 | 49,730 | 46,230 | 54,140 |
| Elongation percent | 41 | 14 | 16 | 22 | 5 |
| Annealed: | | | | | |
| Tensile strength p.s.i. | 35,520 | 40,010 | 34,190 | 39,240 | 34,430 |
| Elongation percent | 47 | 41 | 10 | 34 | 5 |
| No. of bends to fracture (Copper=1) | 14-15 | 12-15 | 10 | 10-11 | 2-3 |

The above results show that increasing the amount of boron in the boron-copper alloys results in a corresponding increase in tensile strength both in the cold worked condition and in the annealed condition. Moreover, the results show that alloys containing about 0.1–0.8% boron are far superior to copper in resisting failure from bending.

EXAMPLE III

Six grams of boron particles of about 200 mesh size and containing 99+% boron were mixed in a ball mill with 44 grams of copper powder of about 100 mesh size. The resulting mixture was compressed into one-half inch diameter cylinders which were packed in a graphite crucible. The crucible was placed in a furnace and hydrogen gas was introduced to purge the air from the furnace and to maintain an inert atmosphere during the run. The furnace was heated to about 1500° C. and maintained at this temperature for about one-half hour, during which time the mixture was stirred with a graphite rod.

The resulting molten alloy was cast into ingots having a boron content of 9.60%. The malleability of the product was shown by hammering a sample on an anvil without causing any fracturing of the material. These ingots can be used as master alloys in a manner similar to the product of Example I.

The following example illustrates the use of a lower grade of "elemental boron" of the character mentioned above in the process of the present invention.

EXAMPLE IV 27 grams of boron particles of about 40 mesh size and containing about 92% elemental boron were mixed with 500 grams of copper powder of 40 mesh size and an alloy prepared from the mixture according to the procedure of Example I. The resulting product weighed 518 grams and contained 4.62% boron against a calculated theoretical yield of 4.76% boron based on the weight of the starting materials. The malleability of the product was shown by cold pressing the alloy into a variety of shapes without causing any fracturing of the material.

As shown in the foregoing examples and description, the present invention provides a process for the production of boron-copper alloys of high purity and uniformity and which possess a high degree of malleability. Also, the invention provides for the production of alloys containing up to about 5% boron which can be formed directly into useable shapes, and also, alloys containing up to about 10% boron which can be utilized as master alloys to produce alloys containing lesser amounts of boron.

It is apparent from the above description of the invention that various modifications can be made within the scope of the present invention. Therefore, the invention is not intended to be limited to the details of the process as disclosed herein, except as may be required by the appended claims.

What is claimed is:

1. A method of making alloy-like copper-boron compositions comprising preparing an intimate mixture of particulate copper and particulate boron, and heating said mixture to above 1450° C.

2. A method of making alloy-like copper-boron compositions comprising preparing an intimate mixture of particulate copper and particulate boron, and rapidly heating said mixture to above 1450° C.

3. A method of making alloy-like copper-boron compositions comprising preparing an intimate mixture of particulate copper and up to about 10% by weight of particulate boron, and rapidly heating said mixture to above 1450° C.

4. A method of making alloy-like copper-boron compositions comprising preparing an intimate mixture of particulate copper and particulate boron, compressing said intimate mixture into a coherent mass, and heating said compressed mixture to above 1450° C.

5. A method of making alloy-like copper-boron compositions comprising preparing an intimate mixture of particulate copper and particulate boron, and rapidly heating said mixture in an inert atmosphere to between about 1450° and 1700° C.

6. A method of making alloy-like copper-boron compositions comprising preparing an intimate mixture of particulate copper and between about 0.1% and 10% by weight of particulate boron, compressing said intimate mixture into a coherent mass, and heating said compressed mixture in an inert atmosphere to between about 1450° and 1700° C.

7. A method of making alloy-like copper-boron composions comprising preparing an intimate mixture of particulate copper and particulate boron, and introducing said mixture into an inert atmosphere which has been previously heated to above 1450° C. so as to rapidly heat said mixture to an alloying temperature.

8. A method of making alloy-like copper-boron compositions comprising preparing an intimate mixture of particulate copper and between about 0.1% and 10% by weight of particulate boron, compressing said mixture into a coherent mass, and introducing said compressed mixture into an inert atmosphere which has been previously heated to between about 1450° and 1700° C. so as to rapidly heat said mixture to an alloying temperature.

References Cited in the file of this patent

Lihl et al.: Herstellung and Konstitution der Kupfer-Bor Legierungen, Metall, 1954, vol. 8, No. 1, pp. 11–20 (especially page 15, paragraph G).

Constitution of Binary Alloys, 2d edition, pages 245 to 249, edited by Hansen; published in 1958 by the McGraw-Hill Book Co., New York.